United States Patent [19]

Brant et al.

[11] Patent Number: 5,799,200
[45] Date of Patent: *Aug. 25, 1998

[54] POWER FAILURE RESPONSIVE APPARATUS AND METHOD HAVING A SHADOW DRAM, A FLASH ROM, AN AUXILIARY BATTERY, AND A CONTROLLER

[75] Inventors: William A. Brant, Boulder; Michael E. Nielson, Broomfield; Edde Tin-Shek Tang, Boulder, all of Colo.

[73] Assignee: EMC Corporation, Hopkinton, Mass.

[*] Notice: This patent issued on a continued prosecution application filed under 37 CFR 1.53(d), and is subject to the twenty year patent term provisions of 35 U.S.C. 154(a)(2).

[21] Appl. No.: 536,519

[22] Filed: Sep. 28, 1995

[51] Int. Cl.⁶ ........................................ G06F 1/00
[52] U.S. Cl. .................. 395/750.08; 395/427; 365/229
[58] Field of Search ................ 395/750, 427–497.04; 365/229

[56] References Cited

U.S. PATENT DOCUMENTS

| | | | |
|---|---|---|---|
| 4,092,732 | 5/1978 | Ouchi | 364/900 |
| 4,722,085 | 1/1988 | Flora et al. | 371/38 |
| 4,761,785 | 8/1988 | Clark et al. | 371/51 |
| 5,241,508 | 8/1993 | Berenguel et al. | 365/229 |
| 5,274,799 | 12/1993 | Brant et al. | 395/575 |
| 5,438,549 | 8/1995 | Levy | 365/229 |
| 5,519,663 | 5/1996 | Harper, Jr. et al. | 365/229 |

*Primary Examiner*—Ayaz R. Sheikh
*Assistant Examiner*—Jigar Pancholi
*Attorney, Agent, or Firm*—William J. Kubida, Esq.; Earl C. Hancock, Esq.; Holland & Hart LLP

[57] ABSTRACT

Data in a system having dynamic random access memories (DRAM's) is preserved despite loss of the primary source of electrical power to that system. A Flash RAM and a small auxiliary power source are employed by a controller independent of the system to transfer the DRAM contents to the Flash RAM immediately upon loss of primary system power. The data is also automatically returned to the DRAM after return of primary power with special data signals or sequences being utilized in a multiple controller environment so as to award the complete data recovery function to the first controller to demand attention.

10 Claims, 6 Drawing Sheets

POWER FAILURE RESPONSIVE APPARATUS AND METHOD HAVING A SHADOW DRAM, A FLASH ROM, AN AUXILIARY BATTERY, AND A CONTROLLER

BACKGROUND OF THE INVENTION

1. Field of the Invention

The present invention relates to data processing systems and methods including arrangements for ensuring integrity of data manipulated thereby. More particularly, the present invention relates to data processing apparatus and processes which are adapted to prevent degradation of data handled by the system despite losses of primary electrical power sources. While not necessarily limited thereto, the present invention is especially useful for preserving digital data during a primary power outage and for retrieving it for further manipulation by computer apparatus and methods in configurations employing multiple data buses, multiple controllers, arrays of magnetic storage devices, and multiple dynamic random access memories.

2. Description of the Related Art

Computer memory systems are generally classified as either volatile or non-volatile. A volatile storage device depends upon continuous application of primary power from a source to maintain the information placed in it. For instance, a bistable circuit will switch between the zero state and the one state depending upon signals introduced to it, and will retain its last state as long as the power supply is coupled thereto. Even loss of that power for a short period means that its state upon reintroduction of power is meaningless.

Conversely, non-volatile storage is not dependent upon continuous power application thereto to maintain the integrity of its data significance. For instance, digital data stored as a function of particular magnetic orientations in a magnetic media is impervious to any continuity of power supply. Thus, data stored on a magnetic disk, or magnetic tape, does not change merely because power to the drive circuit which writes or reads that data is lost and regained. The data thus stored is recoverable despite intermittent presence of power for the circuitry associated with such a drive. Hence, the characterization of such storage as non-volatile.

The increased reliance of the data processing industry on integrated circuits with their attendant speed has increased the susceptibility of such systems to data loss or degradation because of primary electrical power loss or fluctuations. The elements associated with performing logical and mathematical functions on data have historically relied upon volatile circuitry for this purpose. The industry for many years has endeavored to improve the reliability of the power sources used, as well as to develop so-called "soft fail" systems. The soft fail approach depends upon the system recognizing early that power loss is imminent, and to utilize the remaining residual of power to transfer critical data from volatile storage into nonvolatile storage where it is recoverable when power is again present and stabilized.

A Dynamic RAM (DRAM) type of memory is relatively fast operationally. Another type of RAM is the Static RAM which likewise is relatively fast. For example, one version of a Static RAM can retrieve every word out anytime at 20 nano-seconds a piece. The problem is a Static RAM costs five times as much as a DRAM, and they are not integrated to the same density as DRAM because of the addressing. That is, eight megabit Static Ram chips are currently available, whereas the state of the art for Dynamic Rams is 64 megabits. The Static Ram cell takes more space. Four megabytes of contemporary non-volatile RAM costs significantly less than a Static RAM Thus, DRAM modules are preferred for many data processing systems. However, they utilize volatile memory elements, and thus demand some form of reliable backup system in the event electrical power from a main or primary power source for the system is lost. Static RAM does not require the refresh control logic, but entails a prohibitive price despite having relatively low power requirements for data retention during power loss. In fact, it does not take much Static RAM cost before the user can afford UPS.

SUMMARY OF THE INVENTION

An object of the present invention is to provide a data processing system which enjoys the operational advantages of volatile memory devices having a relatively large memory capacity, but with the further advantages of non-volatile retention of data in response to power failures. A single module containing both a DRAM and a Flash ROM works to automatically preserve data in the event electrical power is lost from a primary power source. Data is moved from the DRAM to the Flash ROM where it remains as long as power is not available from the primary source.

The aforementioned module is configured as a unit which is self-contained and potentially replaceable or transportable. The data storage and recovery process is automatic and transparent to the other system controllers and processors. It appears to the associated controllers that the DRAM never lost its contents. At most, a small battery as an auxiliary power source is used which only is active long enough to move data from the DRAm to the Flash ROM.

Apparatus and processes in accordance with this invention are dedicated to the preservation of data contained in a system enabled by a primary electrical power source, and employing a Dynamic Random Access Memory (DRAM). The present invention advantageously utilizes a Flash ROM and a special purpose controller for this purpose.

The controller includes an arrangement for initializing the Flash ROM, as well as for performing a data preservation function. The initializing arrangement responds to each initial application of power from the primary source to the system for applying an erase signal to the Flash ROM. This readies the Flash ROM for quick response to a power failure by completely clearing it. The data preservation function is performed upon detecting loss of power from the primary power source. Thus, the power loss detection triggers a transfer of the data contained in the dynamic random access memory into the Flash ROM.

It is preferred to render the system insensitive to the primary power source to include an auxiliary power source such as a battery. Upon loss of power from the primary source, the controller causes the application of power from the auxiliary power source to the controller until the data transfer from the dynamic random access memory to Flash ROM is completed. In response to return of power from the primary source, the data is retrieved and returned from the Flash ROM to the dynamic random access memory.

The present invention is intended for use in conjunction with a data processing system having a plurality of controllers, each including an aforesaid data retrieving and returning arrangement. Each of these controllers further include structure or steps for storing a signal indicating that the recovery of data from the Flash ROM to the dynamic random access memory was initiated by the associated controller. This prevents multiple controllers from attempting concurrent data retrieval.

The present invention relates to a method of preserving data contained in a system enabled by a primary electrical power source which system employs at least one DRAM unit. This method includes the steps of clearing the contents of a Flash ROM, sensing that the primary power source is no longer supplying power to the system, and transferring the data contents present in the DRAM into the Flash ROM. Once it is recognized that the primary power source is again supplying power to the system, the method in accordance with the present invention includes the step of returning the data from the Flash ROM to the original DRAM.

This method can further include the step of utilizing an auxiliary power source for preserving the contents of the DRAM, and for actuating the Flash ROM during the transferring step. To prevent duplicate attempts to return the data to the DRAM, the process can include a step of storing a signal indicating that the returning step was initiated. This stored signal is thus useful for preventing concurrent attempts to perform the data returning step.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

Figure 1:
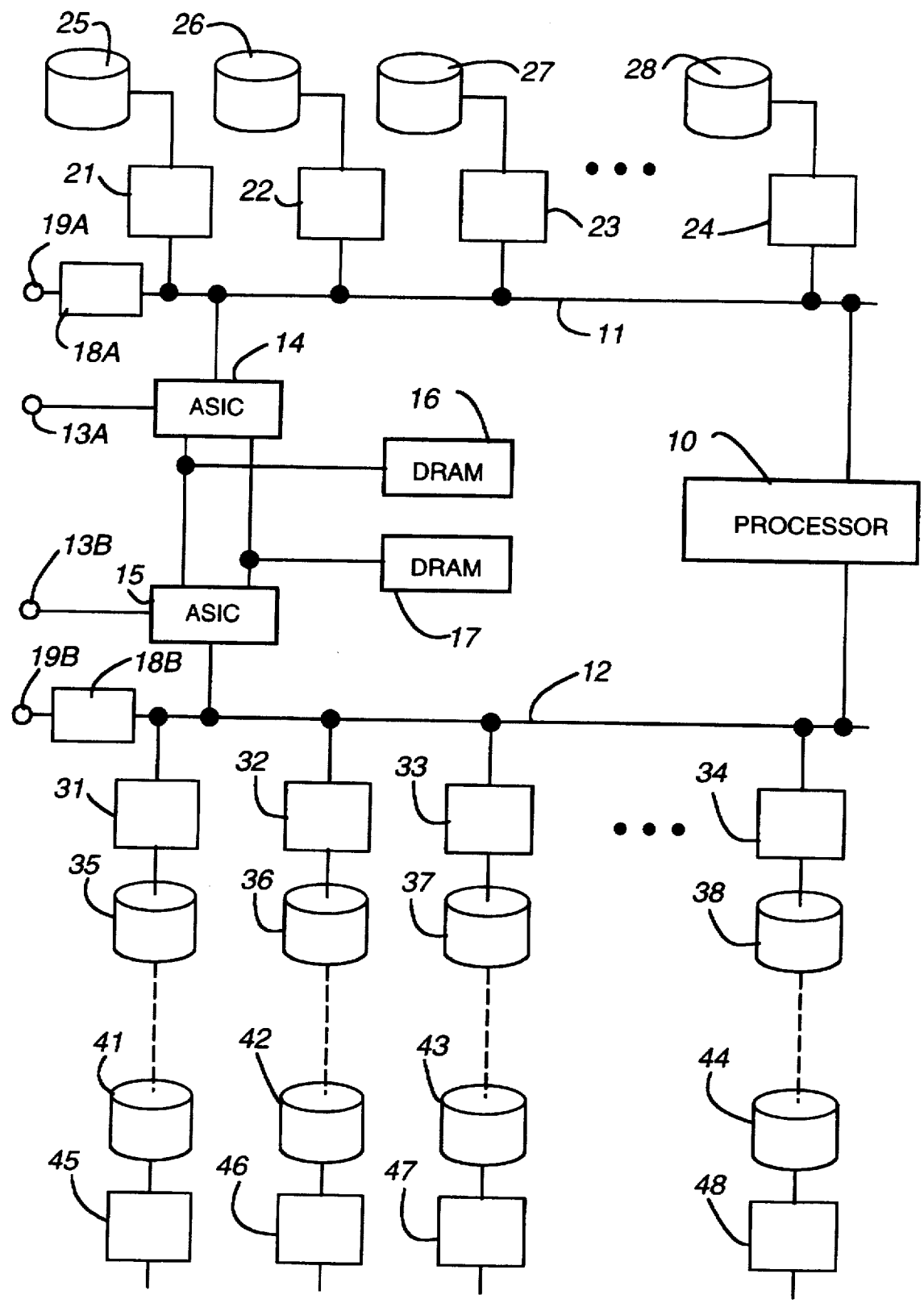
FIG. 1 is an overall block diagram of a disk controller data processing system suitable for incorporating the present invention.

The problem resolved by the present invention relates to data integrity preservation in conjunction with a data processing system employing DRAM modules as volatile memory elements. One example of such a system is shown in FIG. 1 which is an arrangement for controlling a multiplicity of disks in a manner transparent to a host system (not shown). The FIG. 1 disk controller system uses a processor 10, which is in communication with two Peripheral Communication Interconnect (PCI) buses 11 and 12. These buses use a bus protocol common among personal computer environments. Many chips are plugged directly into these types of buses. The PCI bus is not the processor bus or CPU bus, but rather another bus, such as a local bus.

The remote computer, or host system, is coupled through host interface devices 18A and 18B which are, in turn, connected to the PCI buses at terminals 19A and 19B. The FIG. 1 system appears to the remote computer as a single, large capacity, disk storage device. Commands and data from the remote system are received by the interface devices 18A and 18B at terminals 19A and 19B which stores whatever is received in DRAM units 16 and 17 described below. Interface devices 18 then notify the processor 10 that these commands and/or data are stored. Processor 10 determines the functions required, and directs the various components in storing data received from the remote computer, as well as for collecting data to transmit outwardly at serial dump links 13A and 13B.

The system of FIG. 1 has dual, redundant Application Specific Integrated Circuit (or ASIC) modules 14 and 15, and a plurality of Small Computer System Interface (SCSI) devices 21–24 and 31–34, all of which are similarly coupled into buses 11 and 12. The configurations of these buses are well known in the industry. They are sufficiently defined that many systems are configured with chips that plug directly onto them, or in some cases, the chips are positioned on boards and attached to the bus via wires. A plurality of disks, such as 25–28 and 35–38, are coupled through the SCSI interface devices 25–28 and 35–38 into the buses 11 and 12.

The pair of ASIC modules 14 and 15 each functions as a controller in response to processor 10 for interfacing with a pair of redundantly coupled Dynamic Random Access Memory (DRAM) modules 16 and 17. DRAM module 16 is active, and module 17 is a shadow data memory for ensuring reliability through redundant operations. The two DRAMs are each configured as separate modules (note FIG. 2 for module 17) on boards arranged to cooperate with two memory buses into ASIC modules 14 and 15. The system is redundant with the first DRAM 16, referred to as a DM for data memory and DRAM 17 as an SM for shadow memory. The latter is thus a redundant memory that parallels the main, active DM unit which normally works directly with processor 10 and controller modules 14 and 15.

When data is received from the remote host, one of the DRAM associated chips is assigned to act as the active host interface chip. Module 16 provides this function in FIG. 1. That board works into a Small Computer System Interface (SCSI) and/or the remote host interface device 18A coupled to terminal 19A. These couplings could take the form of a fiber optic interface into the remote host system, as well as into PCI buses 11 and/or 12.

The received data is written into both DRAM 16 and 17 memories simultaneously. There is no degradation of performance because this writing is done in parallel. The host is notified when the writing is finished with an acknowledgement.

Each ASIC module 14 and 15 associated with modules 16 and 17 has a serial connection 13A and 13B so that a serial dumping goes to the other module 14 or 15 which has exactly the same architecture. The system has redundant controllers 14 and 15 which also have access to all the disks. The connection between the controllers 14 and 15 is the two serial links and the SCSI buses. The PCI buses 11 and 12 function independently in response to the controllers.

The systems have redundant power (not shown) and have the power system split out in different ways to render system operation continuous even if one power supply fails. The problem arises when AC power is lost to the whole system. A prior approach to overcome this event is by powering the system by a Universal Power System (UPS). This is not attractive for lower end systems, where space and/or expense are critical. UPS is a fairly expensive option.

It is important for such lower end systems that lost power to the entire system does not result in loss of the data. In accordance with the present invention, the original DRAM module is removed, and is replaced by module 17 which operates like the removed module as far as the system is concerned. Module 17 includes the capability upon return of system power to present the original data for reloading into the associated DRAM. A DRAM, typically accessed through a single access transistor and a single capacitor, is a volatile storage, so it is necessary to continuously refresh it which requires introduction of multiplexed addresses.

As mentioned, the problem solved by the present invention is the preservation of the data memory contents in a DRAM utilized by a controller for data exchanges with a remote system despite loss of a primary power source. The DRAM has to log a refresh cycle because the DRAM cells require periodic access to them to refresh their contents. Static RAM does not require this refreshing, but, as mentioned previously herein, there is an unacceptable cost penalty for using the Static RAM.

Figure 2:
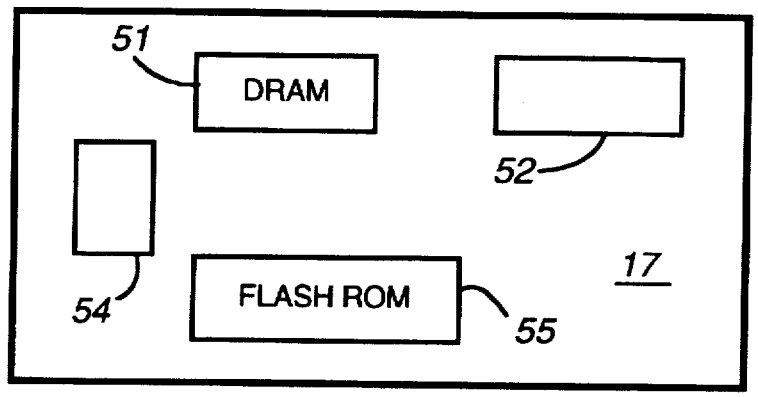
FIG. 2 is a circuit board mounting elements of the present invention.

FIG. 2 shows the shadow DRAM module 17 including the active DRAM 51, an auxiliary power source in the form of a battery 52, controller 54, and the Flash ROM 55. This assembly is a unit which is pluggable as an element of the system where the elements all interface amongst themselves. The Flash ROM/DRAM Module 17 replaces the shadow DRAM module on the controller board. The module 17 has both the DRAM 51 and Flash ROM 55. This module is also compatible with industry standards. That is, it is constructable to appear just like an industry standard DRAM module.

Module 17 shown in FIG. 2 in accordance with the present invention advantageously utilizes Dynamic RAM fabricated into a relatively tiny module that appears nonvolatile to the system. The contents of the DRAM 51 are continuously refreshed, as long as power from the primary source is available. To enable data recovery, a battery 52 is included as part of the module 17 to control the logic 54 and other circuitry to transfer the DRAM 51 memory contents into the Flash ROM 55 upon loss of primary power. The Flash ROM 55 is a non-volatile RAM or electrically erasable PROM with appropriate densities.

The term Flash ROM is applied to the device in reference to its erase mode. It is necessary to erase it before it is possible to write into it. However, once data is written into a Flash ROM, it remains there without the need for refreshing or application of continuous power. Flash ROMs are erased entirely with one operation. It has cycle times that are on the order of 80 to 120 nano-seconds per access in the present state of the art. A Flash ROM does not have the life span of a DRAM or other memory devices, so is not generally acceptable for continuous use, such as in place of a DRAM in the presently disclosed system. Also, a Flash ROM is considerably slower than a DRAM. However, a Flash ROM is capable of hundreds of thousands of cycles between failures which is satisfactory for the backup function it provides in conjunction with the present invention. Flash ROMs are generally conventional, and there is information available about them in the industry.

The FIG. 2 module 17 appears similar to a contemporary Dynamic RAM module, such as module 16. It includes a DRAM 51, but also has a small local controller 54 and a Flash ROM 55 having an amount of storage comparable with DRAM 51. The module 17 is roughly the same form factor as the DRAM module 16. As far as the system is concerned operationally, it is the same as a contemporary DRAM module 16. Likewise, transparent to the host processors is the fact that module 17 includes a small auxiliary power source which is battery 52. It only needs enough battery 52 power to allow it, when it detects a power loss in its memory, to keep the DRAM 51 alive just long enough to transfer the data from the DRAM 51 to the Flash ROM 55.

Thus, the processor 10 sees module 17 of FIGS. 1 and 2 like a DRAM, but it has a nonvolatile nature to it. This obtains the benefits of speed and the density of DRAM, but in a non-volatile functioning mode. It is transparent to the remote processor, and relieves the system of concern about the case where power fluctuates.

The system essentially parallels the second DRAM 51 which is the shadow DRAM with the Flash ROM 55. Normally, the module 17 operates as the shadow DRAM but should there be a power failure, the DRAM data is moved to Flash ROM 55 where it is held until power is restored. More expensive and volume demanding backup systems, such as the UPS power backup for the system, is then not required to provide "fast write" capability. The module is controlled through available control and sense signals from processor 10, and the system ASIC units 14 and 15.

The flash module 17 is controlled through existing outputs from system processor 10. Sense signals are read through the DM and SM bits into the processor 10. The controls are set up such that, when the data is surveyed, it is possible to determine that it was recovered, that meaningful data exists, and that the download is complete. The user might also want to make sure that this data is marked as stale after it was returned to DRAM 51. This is illustrated in the flowcharts in FIGS. 4, 5 and 6.

Figure 5:
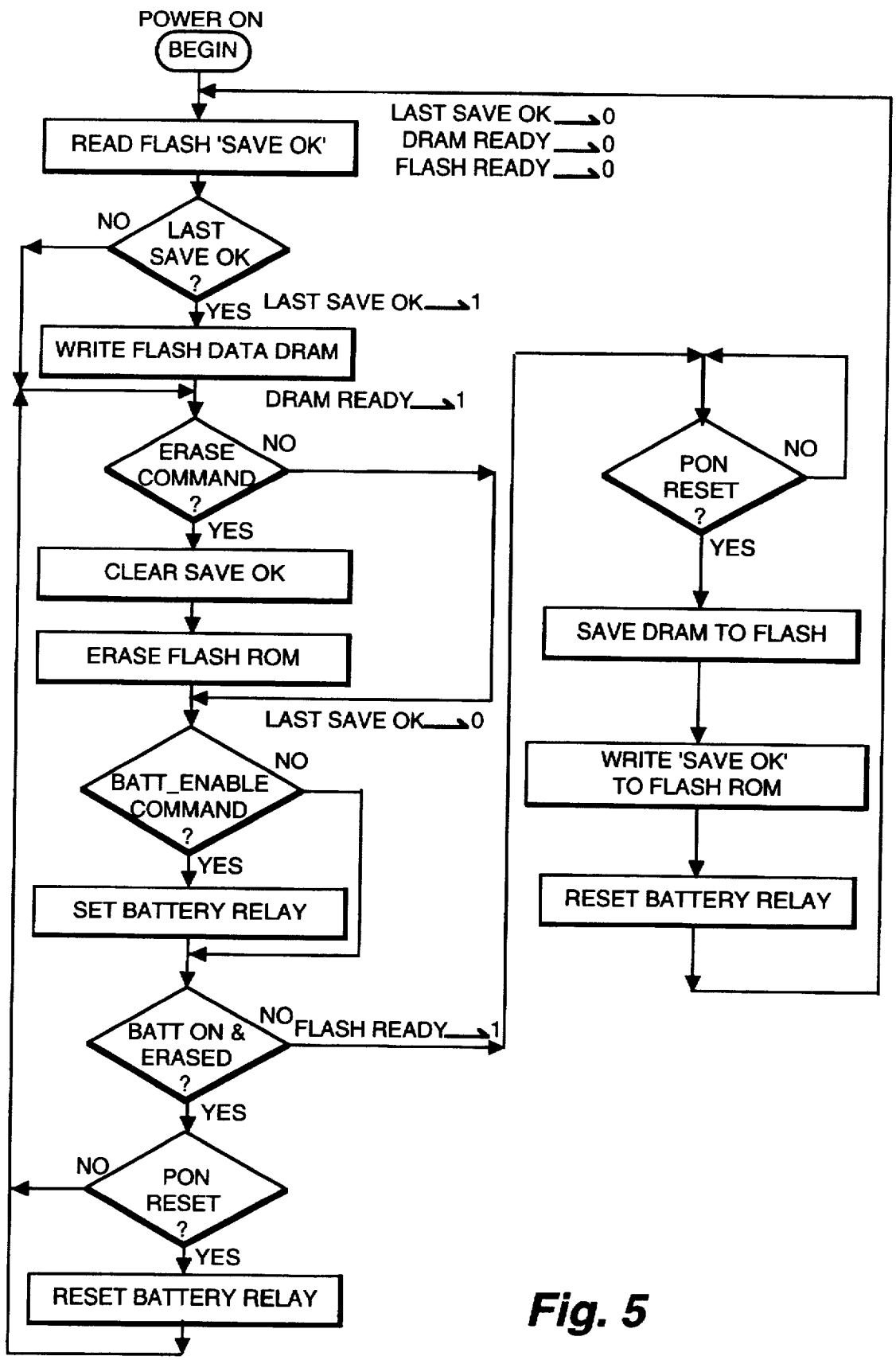
FIG. 5 is flowchart of the Flash Module operation.

Upon a power failure, a dump from the DRAM 51 to the Flash ROM 55 is effected. To prepare for this operation, an erase on Flash ROM 55 is previously performed during initialization upon Power On Reset (PON). As shown in FIG. 5, the Begin function is accompanied by clearing three stored bits; namely, Last Save OK, DRAM Ready and Flash Ready. The Last Save OK is cleared in preparation for receiving an indication that the last data save sequence was performed satisfactorily when it does occur. The DRAM Ready indicating that DRAM 51 is ready to receive data, while the Flash Ready bit similarly reflects that the Flash ROM 55 is ready for data storage.

Local controller 54 stores a "Save OK" bit on the Flash ROM 55 when it determines that a successful dump of the contents of DRAM 51 into Flash ROM 55 occurred. As seen in FIG. 5, the first thing that local controller 54 does is to check to see if the Save OK bit is set reflecting that data was previously saved in the Flash ROM 55 suitable for recovery. If so, the Last Save OK bit is set, and the system proceeds to read the Flash ROM 55 data into DRAM 51 and to set the DRAM Ready bit. In addition, the DRAM Ready bit is set.

If the data was not saved so that the Save OK bit is not set in the Flash ROM, then the system recognizes that two points of failure have occurred, and it is not possible to recover valid data. Such an event might occur if both the primary and auxiliary power source failed concurrently. There are various responses possible to such a condition, but they are beyond the scope of this application.

After data is recovered from Flash ROM 55 to DRAM 51, local controller 54, pursuant to the FIG. 5 process, inspects to see if controllers 10, 14 or 15 have generated an Erase command. If so, the Flash ROM 55 is erased and ready to receive new data. The Last Save OK bit is also cleared at this point.

The controller 54 for module 17 additionally includes the ability to turn the auxiliary battery 52 off, and inspects for a Battery Enable command in this regard. Battery 52 is only used as long as absolutely necessary at two times. The first is upon initialization to flash the Flash ROM 55. The second is when primary power is lost, at which time battery 52 is employed to save the data. Immediately thereafter, the battery 52 is turned off so as to avoid draining it.

After Flash ROM 55 is erased, the battery 52 is turned off, and the Flash Ready bit is set, the local controller 54 enters a wait state, as reflected in the right side of FIG. 5. As soon as power is lost, controller 54 transfers the DRAM 51 data to the Flash ROM 55, along with the setting of the Save OK bit and the battery relay is cleared. The system then returns to the Begin step once power on is again detected.

Battery 52 of module 17 is potentially replaceable and/or rechargeable during normal system power application. The first step is to turn the battery 52 on and wait until it is charged. It is then used to perform a flash erase which is followed by generation of an indication that the Flash ROM 55 is ready. The erase cycle is neither instantaneous, nor is it normally completed in a single cycle.

Figure 4:
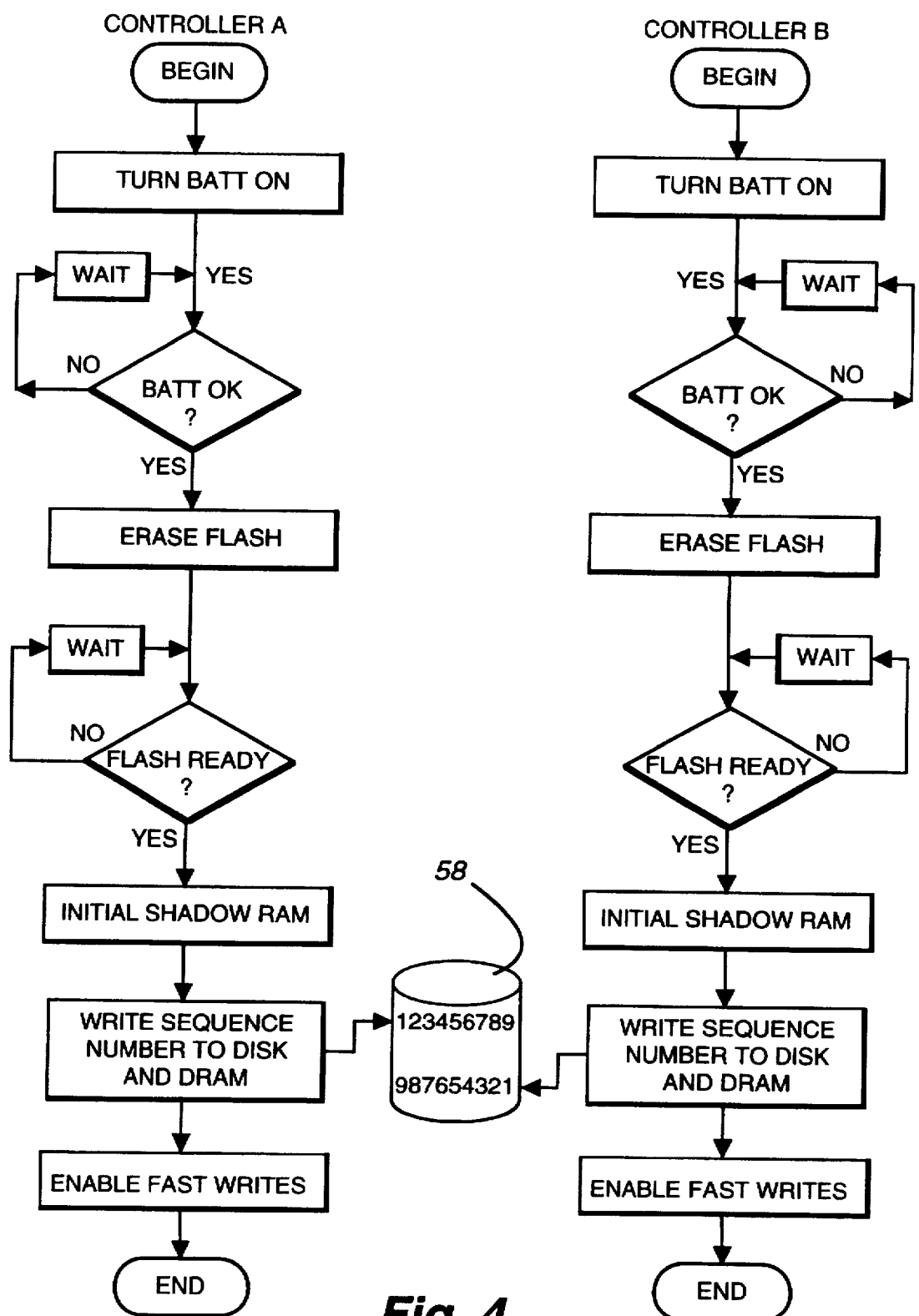
FIG. 4 is a flowchart of the Flash Module initialization process.

In the initializing sequence of FIG. 4, Controller A and Controller B are the ASIC modules 14 and 15. The battery 52 is initially turned on and allowed to charge off the main power source. Next, battery 52 is checked for full charge and, when it is as is indicated by BATCHG from the battery circuit, then the Erase sequence is performed initializing clearance of Flash ROM 55. Thereafter, DRAM 51 is enabled to perform its normal data exchanging functions as the shadow RAM. This initializing has prepared the Flash ROM 55 for writing into the Flash ROM 55 whatever was in the shadow DRAM 51 upon subsequent power failure. During the initialization, a unique sequence number is written that appears in the DRAM 51, as well as on disk 58. Finally, fast writing is enabled.

FIG. 4 depicts the initialization process which includes the placing of a sequence number on the disk 58. The sequence number is written only by one controller 14 or 15 during initialization. Thereafter, this unique sequence number resides in both the Flash ROM 55, and on the disk 58 which is readable by both controllers 14 and 15.

The reason for the sequence number writing is so that, if power returns and the DRAM 51 content is restored, the software knows if it has recovered this data previously. The way the software determines this is by checking the unique sequence number stored with the data in the memory and on the disk 58. It is preferable not to lose synchronization and restore the same write data twice by accident. Because it is stored on a disk that both controllers can see, this provides the ability to verify data recovery. That is, if one of controllers 14 and 15 is actuated and restores the data, the other controller when it is actuated can determine that the sequence numbers in DRAM 51 and on disk 58 do not match thereby reflecting that the first mentioned controller already restored the data. Accordingly, one but not both controllers will restore the data.

It is possible both controllers can boot the system, but one is likely to boot faster than the other for one reason or another. That controller recovers its local data, writes that to the disk and then it also checks to see if it should write the data that requires recovery from the other controller. If so, it pulls in the write data that has to be recovered and restores it. In the meantime, the other controller finishes its boot and examines its local RAM. It finds it has write data, and the way it finds out that data was recovered already or not is by checking the sequence numbers.

If the controller determines from the sequence number that data was already recovered, then the controller does not do anything. Conceivably, one controller could boot so slowly that the other controller not only recovered the data, but now has accepted new host write data. In this case, it is important to prevent the first controller from recovering data by writing over what is even newer data.

In effect, the write sequence determines which one of the two controllers will become the master controller for the current recovery process. One of them will predominate, the other will not. Because the disks are common, it is possible to use a common stored sequence number that is in both the recovered DRAM and the disk 58. If they do not match, the controller recognizes that the system was already recovered.

The reference to fast writes is with regard to the concept that, because the controller has the data stored in two places, it is acceptable to acknowledge the write command before it is actually on a disk so it is referred to as a fast acknowledge.

Figure 6A:
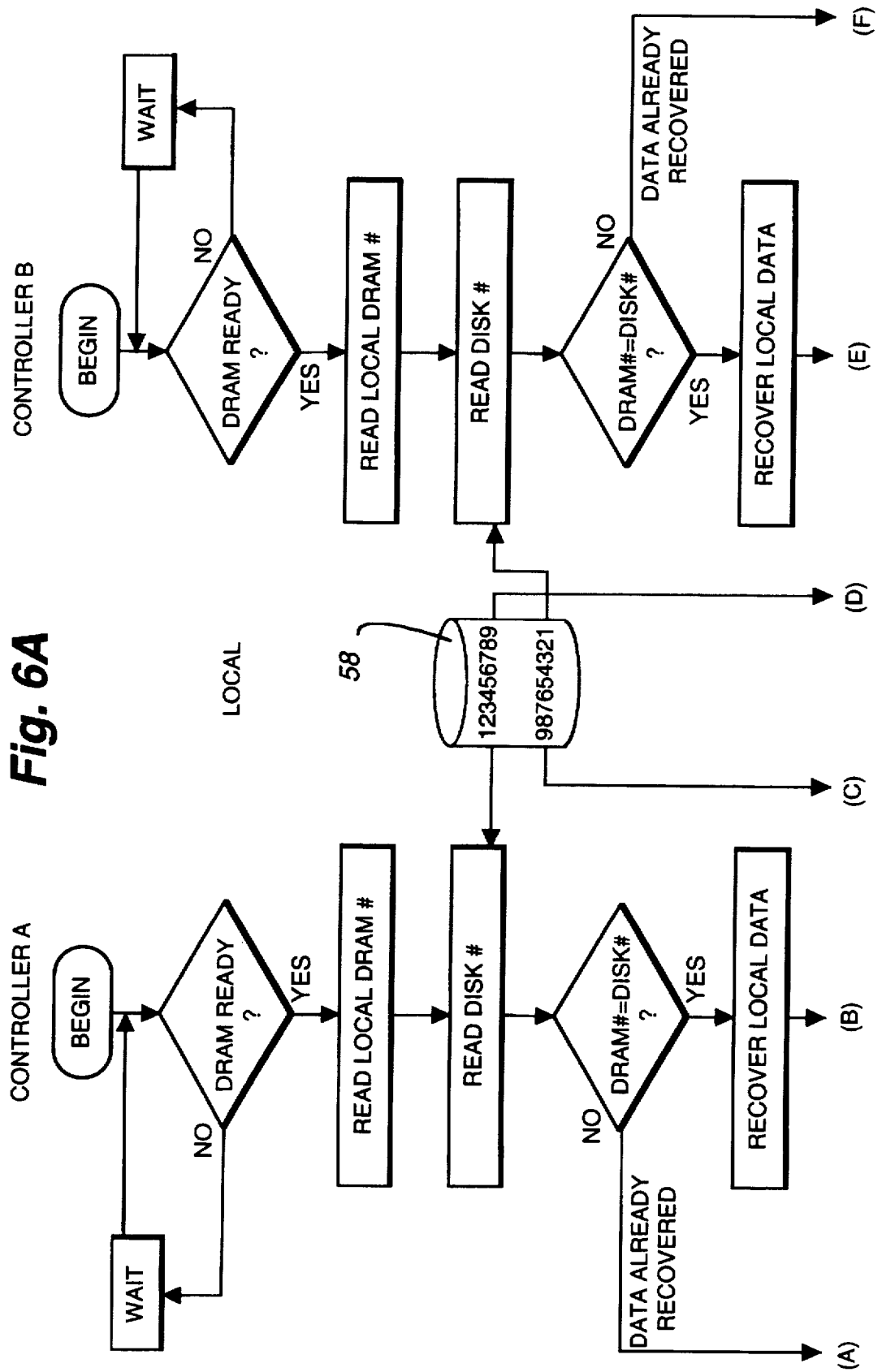
FIG. 6 is made up of FIGS. 6A and 6B and is a flowchart of the write data recovery process in accordance with this invention.
Figure 6B:
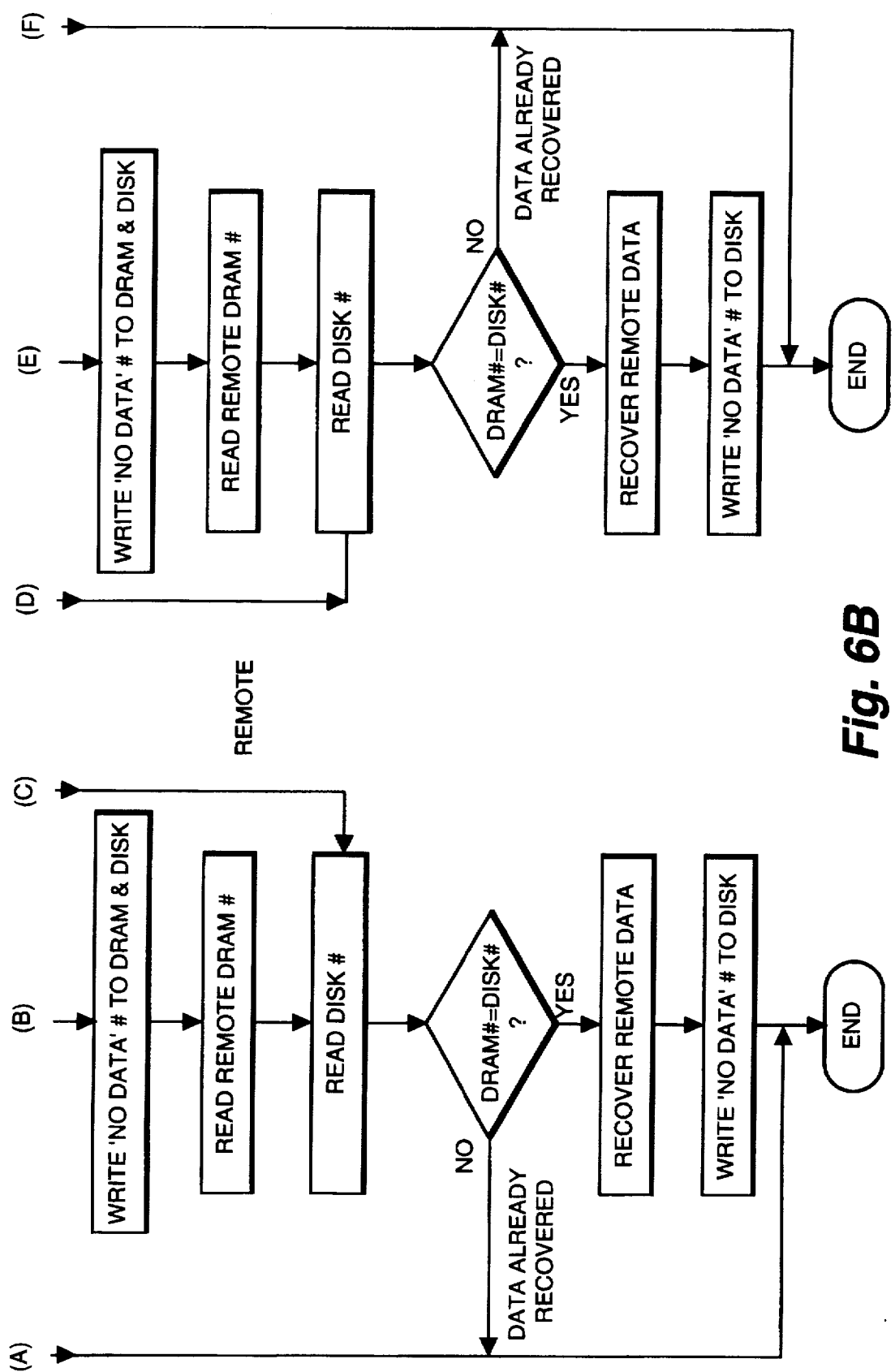

Upon the occurrence of a power failure, the FIG. 6 write data recovery process is initiated after primary power is restored. Once again, controller A is ASIC module 14, while controller B is ASIC module 15. At the Begin block, power from the primary power source has returned, and FIG. 6 is the process that the controllers 14 and 15 follow as opposed to the process that the module follows during normal power-up operations as presented in FIG. 5. Accordingly, FIGS. 4 and 6 show the way the controllers 14 and 15 operate, and how the modules are used in their operational environment.

Assume that the system has operated for awhile so that there is data in the DRAM of module 16, as well as in DRAM 51 at which point the power fails but has returned. Both controllers 14 and 15 are now starting at the Begin block and the recovery process is instituted. There is an initial indicator from the RAM that the software checks to make sure the DRAM is ready. In a typical system, the controller boots during the Begin block which takes sufficient time that the DRAM is always ready. But there is an indicator to make sure that the nonvolatile RAM 55 content has all been transferred to DRAM 51, and that it is ready to operate.

The local DRAM number, or sequence number, is read and compared with the sequence number from disk 58 to see if they match. For purposes of an example, consider the operation of controller 14 in this regard. If it determines the sequence numbers match, then a recovery is initiated by controller 14. If they do not match, then the data was already recovered by controller 15 and controller 14, thus informed, can end its recovery process. Controller 15 has arrived at that point first so it has recovered its local data and now is prepared to handle exchanges of data with the remote host.

If controller 15 has not finished booting to a point where it can communicate with other elements, then controller 14 assumes controller 15 is dead so it is necessary to perform the recovery. This operation is part of the interlock. First the local data is recovered, then the sequence numbers are changed, and then controller 14 writes a "no data number" to DRAM and disk 58. The controller next reads the remote DRAM number and the disk number. They are compared and a conclusion reached either that data was recovered already, or that recovery is needed.

Thus, the first thing done is to recover the local data followed by writing a "no data number" to DRAM and disk 58 so the sequence numbers are changed. When controller 15 is active, it will determine that this data was already recovered. So now if the controller reads the sequence number from the remote DRAM, it will reread it from the disk and perform a compare. If they are not the same, then the remote data was already recovered, and the controller does not have any more to do.

Conversely, if the sequence numbers are the same, the controller recovers the remote data, and then changes the sequence numbers on the disk. Now controller 14 can change the sequence number on the disk and on the controller 14 local memory, but it cannot change it in the memory on the other board. When the data is recovered from the other memory, the controller will change the sequence number on the disk which means then the sequence numbers will no longer match.

The controller cannot accept the host write commands until it has recovered the data and the sequence numbers are changed. At that point, it is guaranteed that no other controller will recover the data. At the Begin point, the controllers cannot communicate with each other, but at the point they are able to communicate with the disk, they are likewise enabled to communicate with each other.

When a controller is ready to recover remote data, this function should not proceed if the remote data is not accepting post write commands because the other controller is already in the process of doing the same recovery. A semaphore is set on the disk to indicate that the other controller is recovering the data so the first controller will not proceed with the recovery. If another power cycle is performed, then both controllers know that those semaphores are incorrect and it is necessary to start over.

Figure 3:
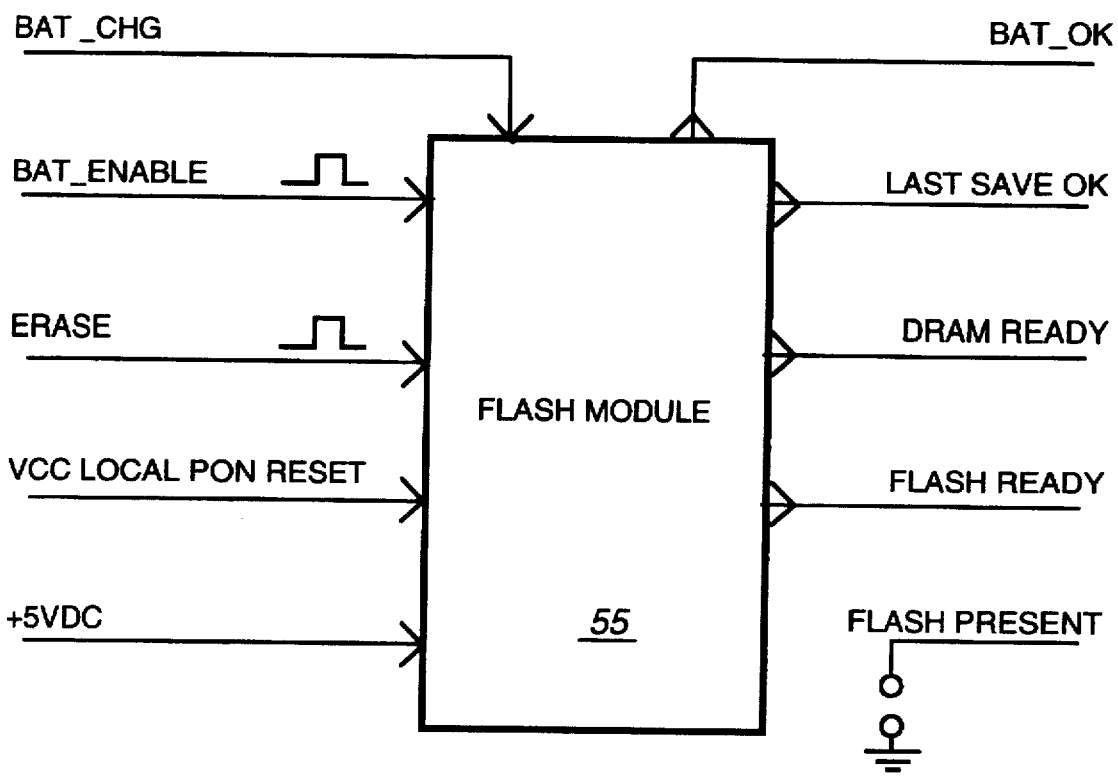
FIG. 3 is a Flash ROM module showing the various input and output signal terminals associated therewith.

All signals connected to the Flash Module 55 shown in FIG. 3 are software readable from the system processor. The following is a table describing the input and output signals for that module.

| Signal Name | from/to | Description |
| --- | --- | --- |
| Batt_CHG | battery circuit | Indicates the battery is charged and ready. |
| batt_OK | ASIC controller | Battery is present and charged. |
| batt_enable | ASIC controller | Pulsed control to enable the module to run on battery. |
| Erase | ASIC controller | Pulsed input to start an erase cycle of the flash memory. |
| PON Reset | processor 10 | Controller Power ON signal that forces board reset when primary power is low. This signal initiates a store to flash operation when Flash Ready is also asserted. |
| Last Save OK | ASIC controller | Indicates that the last save operation completed successfully. |
| DRAM Ready | ASIC controller | When asserted, the DRAM is available for use by the controller. |
| Flash Ready | ASIC controller | Flash ROM is erased and the battery is "on." |
| Flash Present | ASIC controller | Jumper to indicate that the shadow memory is a flash module. |

In summary, the Flash Module plugs into a memory module connector on the controller, and appears as DRAM. If the Flash ROM is erased and the battery is turned on, the Flash Ready signal becomes asserted. PON Reset and Flash Ready assertion causes the Flash Module to switch from controller power to battery power while deasserting DRAM Ready, deasserting Flash Ready, and storing the DRAM contents into Flash ROM. The Flash Module then turns itself off. When system power is restored and there was a save done when the power failed, the Flash Module asserts Last Save OK, reloads the DRAM from the Flash ROM and then asserts DRAM Ready.

The Flash Module is initialized by erasing the Flash ROM and enabling the battery. The battery enable and the erase control signals come from processor 10, and are interlocked such that both cannot be asserted at the same time. Before using the Flash Module to store write data, a sequence number is written to both the system configuration region on disk, as well as the Flash Module DRAM. This number is checked during controller boot to determine if the data in the Flash Module was recovered. If the number in the Flash Module DRAM matches the number on disk, the data requires recovery. If the numbers differ, then the data does not need recovering. When a controller does recover data, it must update the sequence number on the disk to a "no data" number on disk.

FIG. 3 shows a typical Flash ROM module with the input and output signals correlated with the signals presented in the flowcharts. Thus, the Erase signal is the command to erase the module which occurs in the FIG. 4 flowchart in the initialization steps. The battery enable (BAT ENABLE) signal turns the battery on. The PON input signal is the Power On Reset for notifying the Flash Module that power is present, and is associated with the Begin element of the flowcharts.

The Last Save OK and Bat OK signals are produced by the Flash Module 17 after Power On Reset input (VCC LOCAL PON RESET) occurs which is after the module has read the location out of the Flash ROM 55. Note that Flash ROM 55 has an indicator which is stored reflecting that the save was completed so that all the data is secure. Thus, the controller upon power on reads that signal, and then indicates to the system that the last save was successfully completed. That way, the system knows there is data to recover. It is an on-chip signal that is generated when everything that was in DRAM 51 is now safely in the Flash ROM 55.

The controller for module 17 checks the Flash ROM 55 to decide how to set the DRAM READY output bit on power on. During the recovery, the controller checks the Last Save OK line, and then writes the data that is in the Flash ROM 55 to the DRAM 51, thereby setting the output DRAM READY to a one level. The controller checks the LAST SAVE OK which also is set to a one level. The FLASH PRESENT terminals, shown in FIG. 3, is merely an arrangement for allowing the processor 10 and/or the controllers 14 and 15 to perform an inventory test to determine whether or not a Flash ROM module is in place, or if a stand-alone shadow DRAM is present. For instance, a jumper between the two terminals to ground the FLASH PRESENT output could indicate that the standard shadow DRAM is present, and the absence of such a jumper might reflect that a Flash Module is present (or vice versa) to a sensing controller, processor or remote device.

In the initial state on PON, the four output signals from the Flash Module 17 are all set to the true state. Module 17 is self contained, and employs a process which takes place automatically in a structure that enjoys significant cost savings while utilizing a low power, inexpensive battery 52. That is, module 17 is self contained with the advantages that the system board does not have to incorporate all the subsystems and components on it that would take space away from the DRAM module. With the present invention, a non-volatile back-up RAM is provided.

The process is automatic with the control sequence logic 54 built directly on module 17. The cost savings are an advantage over alternatives, such as by using an expensive Static Ram to obtain the same result. All that is required is a short term, auxiliary power source, such as a battery with enough power to complete the save process. Usually, about seventy-two hours is considered as a minimal amount of time to preserve the data, but, with the present invention, the data preservation is virtually indefinite.

The indefinite data storage, because it is a non-volatile RAM, could survive being completely unplugged. It is possible to remove it from a system that suffered a totally catastrophic failure. Potentially, the user could take the controller out, take this module out and recover the data through another mechanism, such as putting on a new controller.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. Apparatus for preserving data that is stored in a volatile manner in a data processing system that is enabled by a primary electrical power source of a non-battery type that is subject to failure, said data processing system employing a first volatile dynamic random access memory for storing said data and a second volatile dynamic random access memory providing backup data storage for said data stored in said first volatile dynamic random access memory, comprising:

a non-volatile Flash ROM connectable to the data processing system;

a controller positioned together with said Flash ROM to be connectable to the data processing system together with connection of said Flash ROM to the data processing system including initializing means and data preservation means;

said initializing means responding to each initial application of power from the primary source to said data processing system for applying an erase signal to said Flash ROM for clearing said Flash ROM;

said data preservation means including loss of power detecting means for subsequently detecting loss of power from the primary power source;

said data preservation means including transferring means immediately responsive to said loss of power detecting means for transferring the data contained in said second dynamic random access memory into said Flash ROM;

an auxiliary battery power source positioned together with said Flash ROM and said controller; and power applying means responsive to said loss of power detecting means for temporarily and immediately applying power from said auxiliary battery power source to said controller until such time as the data transfer from said second dynamic random access memory to said Flash ROM is completed.

2. Apparatus in accordance with claim 1 which includes power return sensing means responsive to return of power from the primary power source for returning data from said Flash ROM to said second dynamic random access memory.

3. Apparatus in accordance with claim 2 for use in conjunction with a data processing system having a plurality of controllers, each controller including a said power return sensing means, and each controller further including storing means for storing a signal indicating that said returning of data from said Flash ROM to said second dynamic random access memory was initiated by the associated said controller.

4. Apparatus in accordance with claim 3 wherein each said controller includes determining means for determining that a said signal was stored by said associated controller, said determining means operating to terminate said returning of data recovery from said Flash ROM to said second dynamic random access memory by an associated controller.

5. Apparatus for preserving data contained in a system enabled by a primary electrical power source of a type that is subject to periodic loss of power, said system employing a main volatile DRAM for exchanging data with a remote data processor and employing a volatile shadow DRAM for providing redundant backup for the main DRAM, comprising:

a non-volatile Flash ROM;

an auxiliary battery power source positioned to be carried together with said Flash ROM; and a controller including initializing means and data preservation means positioned together with said Flash ROM and said auxiliary battery power source;

said initializing means responding to each initial application of power from the primary power source to the system for applying an erase signal to said Flash ROM for clearing said Flash ROM;

said data preservation means including detecting means for detecting loss of power from the primary power source, and temporary powering means powered by said auxiliary battery power source for responding to said detecting means for immediately transferring the data contained in the shadow DRAM into said Flash ROM, said temporary powering means remaining operative only until such time as the transfer of data from the shadow DRAM into said Flash ROM has been completed.

6. The method of preserving data that is contained in a data processing system that is enabled by a primary electrical power source of a type that is subject to failure, which system employs at least one volatile DRAM unit mounted at a mounting base, comprising the steps of:

providing a non-volatile Flash ROM at the mounting base;

providing an auxiliary battery power supply at the mounting base;

clearing the contents of said Flash ROM;

sensing that said primary power source is no longer supplying power to the system;

immediately transferring the data contents present in said DRAM into said Flash ROM upon sensing that said primary power is no longer supplying power to the system;

recognizing that said primary power source is again supplying power to the system;

returning the data from said Flash ROM to said DRAM; and utilizing an auxiliary battery power source for transferring the contents of said DRAM into said Flash ROM only during a time interval of said transferring step.

7. The method in accordance with claim 6 which further includes the steps of;

storing a signal indicating that said data returning step was initiated, determining that said signal has been previously stored, and preventing a subsequent execution of said data returning step when it is determined that said signal has been previously stored.

8. Apparatus for preserving data that is stored in a volatile manner within a data processing system that is enabled by a primary electrical power source of a non-battery type that is subject to a loss of power, the data processing system employing a first volatile dynamic random access memory for storing data, the data processing system further employing a second volatile dynamic random access memory that provides backup data storage for the first volatile dynamic random access memory, and the second volatile dynamic random access memory being physically removable from the data processing system, said apparatus comprising:

a mounting base physically replacing the second volatile dynamic random access memory;

a third volatile dynamic random access memory mounted on said mounting base to be carried therewith;

said third volatile dynamic random access memory providing backup data storage for the first volatile dynamic random access memory;

a non-volatile Flash ROM mounted on said mounting base together with said third volatile dynamic random access memory to be carried with said mounting base;

a controller mounted on said mounting base together with said third volatile dynamic random access memory to be carried by said mounting base;

an auxiliary battery power source mounted on said mounting base together with said third volatile dynamic random access memory and said non-volatile, said auxiliary battery power source connected to selectively provide battery power to said controller, said controller including initializing means and data preservation means;

said controller initializing means responding to each initial application of power from the primary source to the data processing system for applying an erase signal to said non-volatile Flash ROM for clearing said non-volatile Flash ROM;

said controller data preservation means including loss of power detecting means for subsequently detecting loss of power from the primary power source;

said controller data preservation means including transferring means immediately responsive to said loss of power detecting means for transferring data contained in said third volatile dynamic random access memory into said non-volatile Flash ROM;

said controller data preservation means being responsive to said controller loss of power detecting means for temporarily and immediately applying power from said auxiliary battery power source to said controller until such time as data transfer from said third volatile dynamic random access memory to said non-volatile Flash ROM has been completed.

9. Apparatus for preserving data contained in a system that is enabled by a primary electrical power source of a type that is subject to periodic power loss, the system employing a first volatile-DRAM for exchanging data with a remote data processor, and the system employing a physically removable second volatile-DRAM for providing redundant data backup for the first volatile-DRAM, comprising:

a mounting base physically replacing the second volatile-DRAM;

a third volatile-DRAM mounted on said mounting base to be carried therewith, said third volatile-DRAM replacing the second volatile-DRAM as a redundant data backup for the first volatile-DRAM;

a non-volatile Flash ROM mounted on said mounting base together with said third volatile DRAM to be carried by said mounting base;

a controller mounted on said mounting base together with said third volatile DRAM and said controller;

an auxiliary battery power source mounted on said mounting base together with said third volatile DRAM, said non-volatile Flash ROM, and said controller;

initializing means within said controller;

data preservation means within said controller;

first means included said initializing means responding to each initial application of power from the primary power source to the system for applying an erase signal to said non-volatile Flash ROM for clearing said non-volatile Flash ROM;

second means including said data preservation means for detecting loss of power from the primary power source, and operating in response to a said detected loss of power from the primary power source to utilize said auxiliary battery power source to immediately transfer data contained in said third volatile-DRAM into said non-volatile Flash ROM;

said second means remaining operative only until such time as said transfer of data from said third volatile-DRAM into said non-volatile Flash ROM has been completed.

10. Modular memory apparatus for a data processing system susceptible to interruption of system power provided by a primary electrical power source, said modular memory apparatus comprising:

a module connectable to the data processing system;

a volatile memory element at least carried by said module, said volatile memory element for storing data accessible during operation of the data processing system;

a non-volatile memory element at least carried by said module together with said volatile memory element, said non-volatile memory element for storing at least some of the data stored in said volatile memory element;

an auxiliary battery power source carried by said module together with said volatile memory element and said non-volatile memory element; and a controller at least carried by said module together with said volatile memory element, said non-volatile memory element, and said auxiliary battery power source, said module, together with said volatile memory element, said non-volatile memory element, said auxiliary battery power source connectable as a single unit to said data processing system, said controller for detecting the interruption of the system power and, responsive thereto, to effectuate powering of said controller by said auxiliary battery power source, and for effectuating transfer of the data stored in said volatile memory element to said non-volatile memory element.

* * * * *